(12) United States Patent
Schwartzrock

(10) Patent No.: US 12,162,396 B2
(45) Date of Patent: Dec. 10, 2024

(54) CONTAINER TRAILER CRANE

(71) Applicant: Shawn Schwartzrock, Mount Morris, IL (US)

(72) Inventor: Shawn Schwartzrock, Mount Morris, IL (US)

( * ) Notice: Subject to any disclaimer, the term of this patent is extended or adjusted under 35 U.S.C. 154(b) by 255 days.

(21) Appl. No.: 17/382,270

(22) Filed: Jul. 21, 2021

(65) Prior Publication Data

US 2022/0032835 A1 Feb. 3, 2022

Related U.S. Application Data

(60) Provisional application No. 63/103,278, filed on Jul. 29, 2020.

(51) Int. Cl.
| | | |
|---|---|---|
| *B60P 1/64* | (2006.01) | |
| *B60P 1/48* | (2006.01) | |
| *B60P 1/54* | (2006.01) | |
| *B66C 23/00* | (2006.01) | |
| *B66C 23/70* | (2006.01) | |
| *B66C 23/78* | (2006.01) | |

(52) U.S. Cl.
CPC ............. *B60P 1/6472* (2013.01); *B60P 1/486* (2013.01); *B60P 1/5433* (2013.01); *B66C 23/54* (2013.01); *B66C 23/701* (2013.01); *B66C 23/705* (2013.01); *B66C 23/78* (2013.01)

(58) Field of Classification Search
CPC ....... B60P 1/486; B60P 1/5428; B60P 1/5433; B60P 1/6472; B66C 23/16; B66C 23/166; B66C 23/36; B66C 23/44; B66C 23/54; B66C 23/701; B66C 23/705; B66C 23/78; B66C 23/80; B66C 2700/0364; B66C 2700/0371

See application file for complete search history.

(56) References Cited

U.S. PATENT DOCUMENTS

| | | | | | |
|---|---|---|---|---|---|
| 2,782,940 | A | * | 2/1957 | Beseler | B66C 23/36 414/23 |
| 3,301,416 | A | * | 1/1967 | Bopp | B60P 1/5466 212/199 |
| 3,918,741 | A | * | 11/1975 | Olson | B66C 23/80 280/764.1 |
| 4,091,943 | A | * | 5/1978 | Bay-Schmith | B66C 23/58 414/734 |
| 4,613,276 | A | * | 9/1986 | Blatchford | B60P 1/6472 212/257 |
| 4,721,431 | A | * | 1/1988 | Ostermeyer | B60P 1/6472 212/73 |
| 5,688,100 | A | * | 11/1997 | Wunder | B60P 1/6472 414/547 |
| 6,283,699 | B1 | * | 9/2001 | Simpson | B60P 1/6472 414/547 |

FOREIGN PATENT DOCUMENTS

| | | | | |
|---|---|---|---|---|
| WO | WO-9519274 A1 | * | 7/1995 | ............ B60P 1/486 |
| WO | WO-9519275 A1 | * | 7/1995 | ............ B60P 1/6472 |

* cited by examiner

*Primary Examiner* — James Keenan
(74) *Attorney, Agent, or Firm* — Brendan Babcock

(57) ABSTRACT

A container trailer crane has an apparatus that includes a base, a crane arm, an outrigger, and a mechanical ram that is used in both positioning the outrigger and the crane arm.

16 Claims, 5 Drawing Sheets

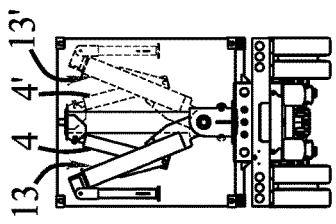
Fig. 3A
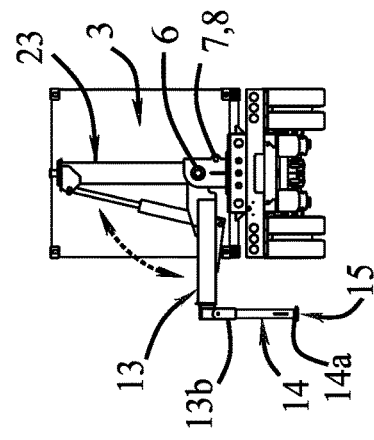
Fig. 3B
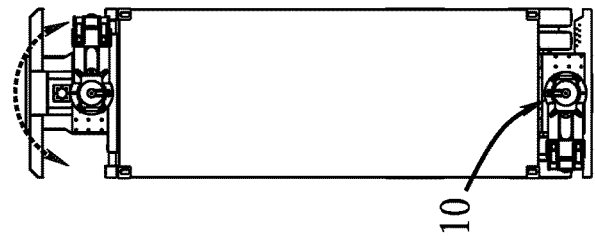
Fig. 2A
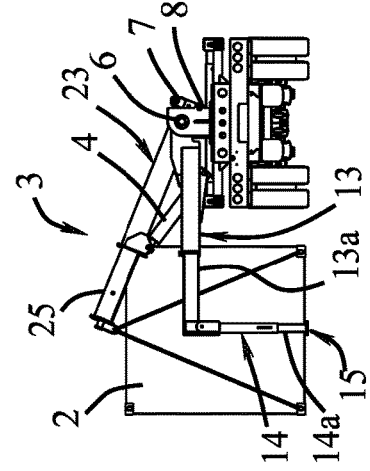
Fig. 2B
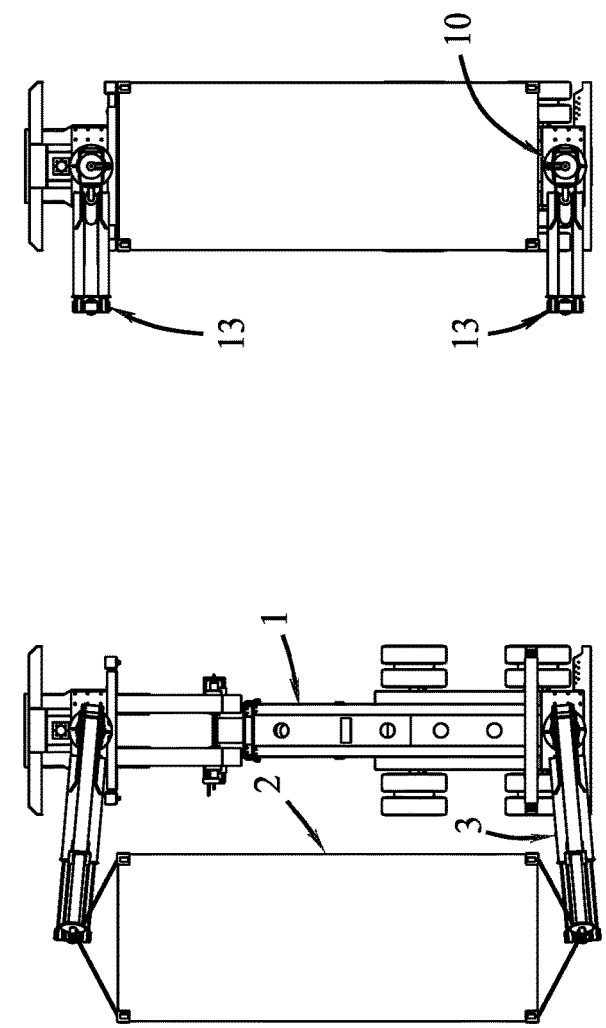
Fig. 1A
Fig. 1B

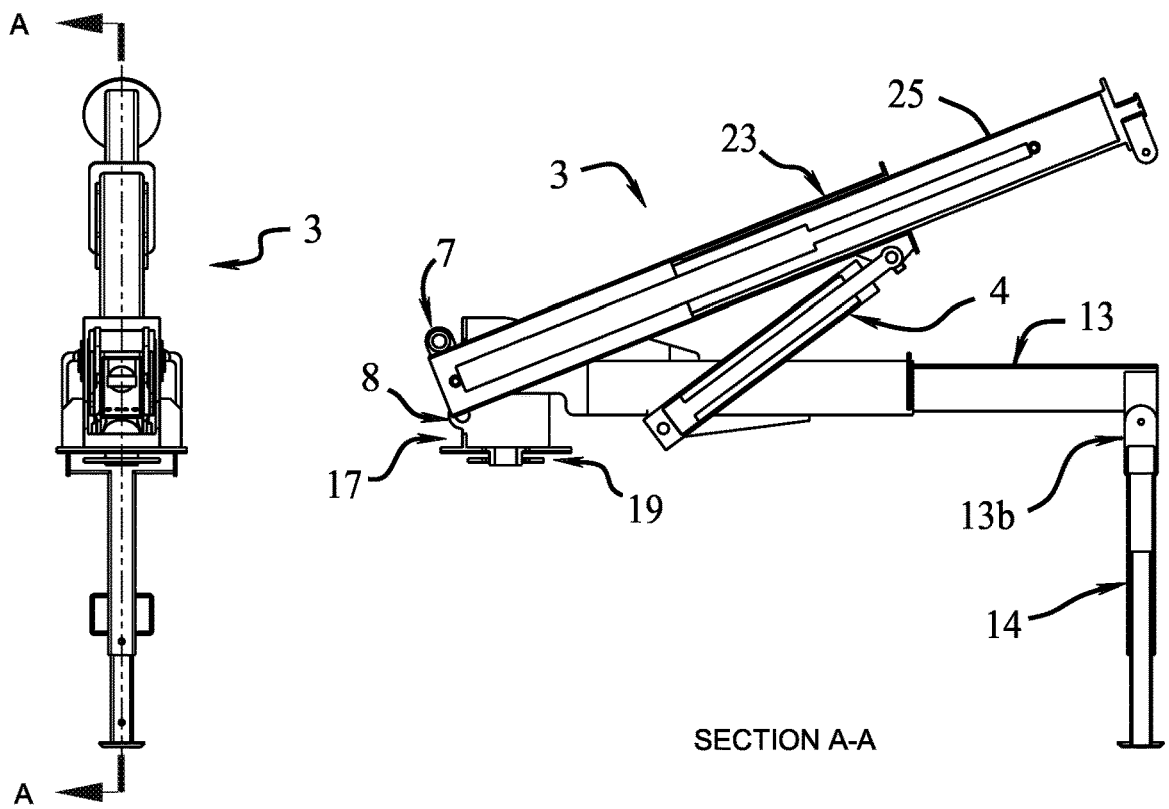
SECTION A-A
Fig. 8
Fig. 9
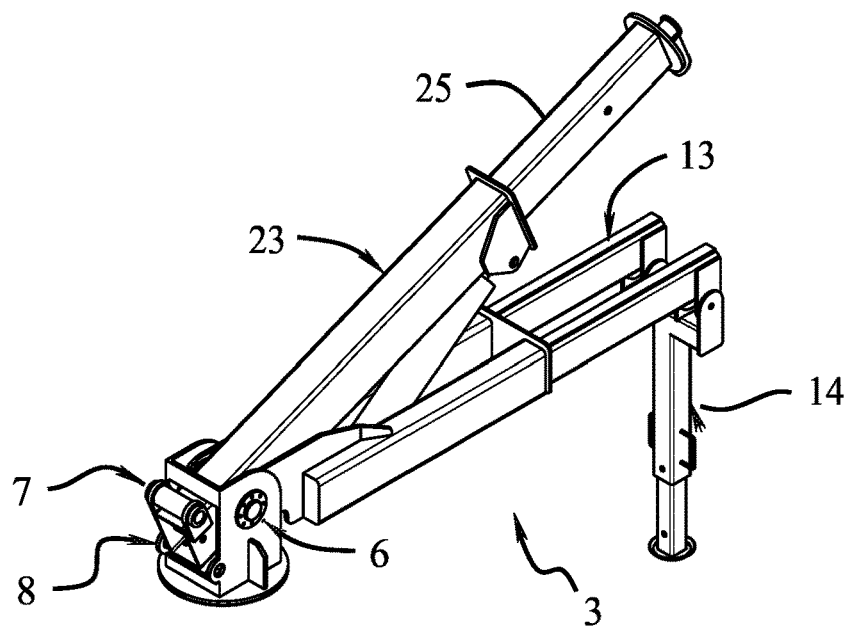
Fig. 10

CONTAINER TRAILER CRANE

CROSS-REFERENCE TO RELATED APPLICATIONS

This Non-provisional application claims priority to provisional patent application (U.S. 63/103,278) filed Jul. 29, 2021.

STATEMENT REGARDING FEDERALLY SPONSORED RESEARCH

Not Applicable

FIELD OF THE INVENTION

This invention relates to a device that can be used to efficiently load and unload a trailer.

BACKGROUND OF THE INVENTION

Container cranes are often mounted on trailers to allow for self-loading and unloading of an ISO shipping container. These cranes are added tare weight that will diminish the load capacity of the container during transport. Because these cranes use heavy mechanical rams and structural components to enable the lifting of these containers, it is desirable to use the least amount of structure and to minimize the number of mechanical rams to reduce weight.

Often, in order for the crane to accomplish the task of loading or unloading an ISO container, outriggers are first positioned to stabilize the crane during loading and unloading of a container; the weight of the container when extended out from the trailer can create an offset load that can destabilize the crane and also the trailer. These outriggers are typically heavy due to the loads that are applied. To position the outriggers during loading and/or unloading, mechanical rams can be used. A mechanical ram is also often used by the crane when lifting the container. Thus, two sets of mechanical rams are often used.

Additionally, many times it is necessary to load or unload the container from either side of the trailer. Not all container cranes have this functionality. Container cranes that do offer this added feature often require more mechanical rams which add weight to the design and can further diminish the transport capacity.

There is a need for a trailer crane that has a reduced weight and can load and unload from either side of a trailer. The instant application provides this need. The art referred to and/or described within this application is not intended to constitute an admission that any patent, publication or other information referred to herein is "prior art" with respect to this invention. In addition, this section should not be construed to mean that a thorough search has been made or that no other pertinent information as defined in 37 C.F.R. § 1.56(a) exists.

All US patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well, only for the purposes of complying with 37 C.F.R. 1.72. The abstract is not intended to be used for interpreting the scope of the claims.

BRIEF SUMMARY OF THE INVENTION

In at least one embodiment of the invention, a container trailer can have a lifting apparatus comprising a base, a crane arm, an outrigger, and a mechanical ram wherein the mechanical ram is used to position both the outrigger and the crane arm. The crane arm can have a lifting end and a pivot end, the pivot end pivotally attached to the base such that the lifting end of the crane arm can be raised and lowered under force of the mechanical ram. Among other mechanisms, the mechanical ram can be controlled by a manual directional control valve and/or an electric solenoid valve to control the rain.

In at least one embodiment of the invention, the crane arm can be lengthened and shortened through an extendable and retractable extender.

In at least one embodiment, the inventive trailer includes a locking hole and an engagement pin wherein the crane arm has a locked position and an unlocked position. In the locked position the engagement pin can be engaged in the locking hole and in the unlocked position the engagement pin can be not engaged in the locking hole. In the locked position, extension of the mechanical ram can lower the outrigger and retraction of the mechanical arm can raise the outrigger. In the unlocked position retraction of the mechanical arm can draw the crane arm toward the outrigger and extension of the mechanical arm can rotate the crane arm from the outrigger. In other embodiments, the outrigger can lock into position and extension and retraction of the ram results in the crane arm being raised or lowered In at least one embodiment, the outrigger has a raised position and a work position. In the raised position the outrigger can be lifted. In the work position the outrigger can be lowered and the leg can engage the ground.

In at least one embodiment, the extender can be extended and retracted by electrical action. In at least one embodiment this electrical action includes an electric solenoid valve controlling movement of the mechanical ram.

In at least one embodiment, the mechanical ram can be selected from a broad group of hydraulic cylinders, linear actuators, turnbuckles, and any combination thereof.

In at least one embodiment, the base of the lifting apparatus can rotate to enable the crane arm to lift items to the left of the trailer, to the right of the trailer, behind the trailer, to the left and behind the trailer, and to the right and behind the trailer.

In at least one embodiment, the outrigger can have an outrigger extender that is extendable and retractable.

In at least one embodiment, the inventive trailer can have more than one lifting apparatus (e.g. with at least one lifting apparatus at the back and at least one lifting apparatus at the front). A lifting apparatus in the back and a lifting apparatus in the front can be constructed and arranged to be secured to the back and the front of a container and lift and load the container onto the trailer.

In at least one embodiment, the inventive container has more than one locking hole. The crane arm can have a locked position and an unlocked position. In the locked position the engagement pin can be engaged in one of the plurality of locking holes and in the unlocked position the engagement pin is not engaged in one of the plurality of locking holes.

BRIEF DESCRIPTION OF THE SEVERAL VIEWS OF THE DRAWING(S)

A detailed description of the invention is hereafter described with specific reference being made to the drawing.

FIG. 1A is a top view of a container trailer crane apparatus on a trailer with an offset container.

FIG. 1B is a back view of a container trailer crane apparatus on a trailer with an offset container.

FIG. 2A is a top view of a container trailer crane apparatus on a trailer with a container.

FIG. 2B is a back view of a container trailer crane apparatus on a trailer with a container.

FIG. 3A is a top view of a container trailer crane apparatus on a trailer with a container.

FIG. 3B is a back view of a container trailer crane apparatus on a trailer with a container.

FIG. 8 is an orthographic view of a container trailer crane apparatus illustrating the cross-sectional cut away of FIG. 9.

FIG. 9 is a cross-sectional side view of a container trailer crane apparatus.

FIG. 10 is a perspective view of a container trailer crane apparatus.

DETAILED DESCRIPTION OF THE INVENTION

Figure 4:
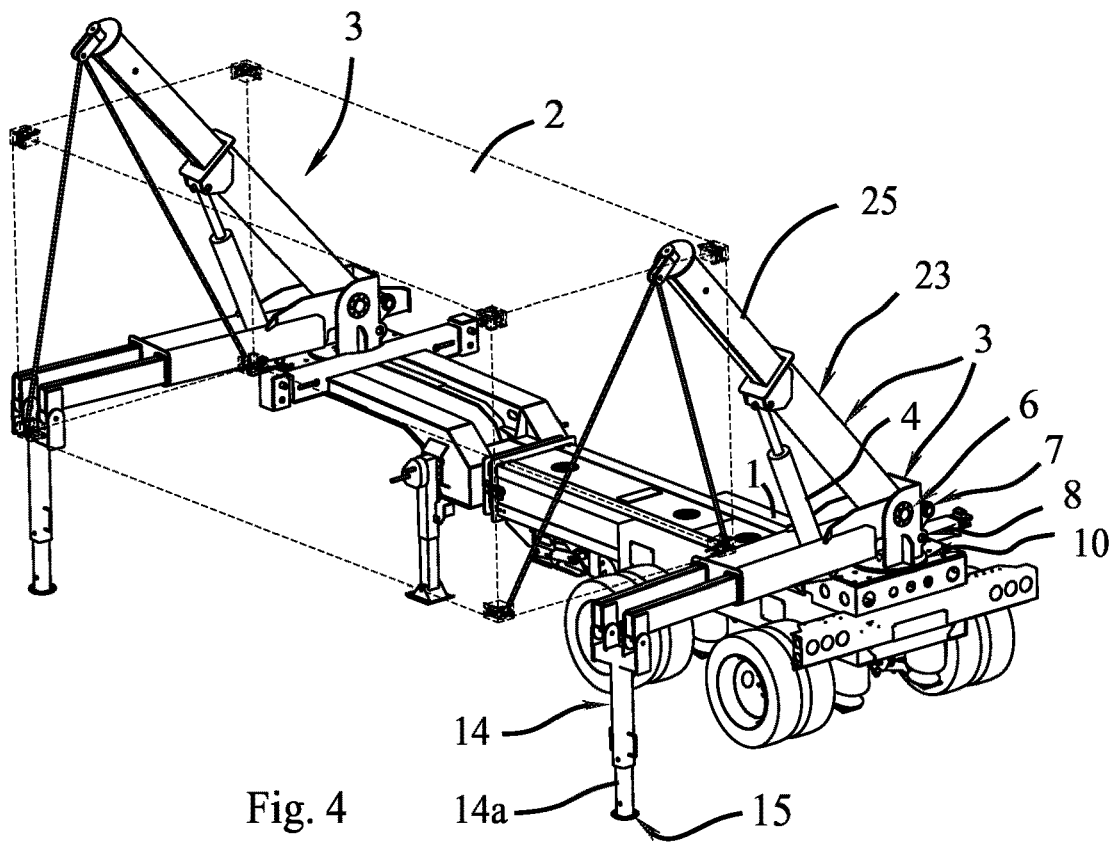
FIG. 4 is a perspective view of a container trailer crane apparatus on a trailer with an offset container.

While this invention may be embodied in many different forms, there are described in detail within the specification specific preferred embodiments of the invention. This description is an exemplification of the principles of the invention and is not intended to limit the invention to the particular embodiments illustrated.

Described below are additional details of the container trailer crane apparatus. FIG. 1A illustrates a top view of the trailer 1 with the container 2 offset and with the container trailer crane apparatus 3 thereon. The crane apparatus 3 is extended such that the container 2 is resting on the ground 100. For purposes of this application the crane apparatus 3 includes two functionalities: the positioning of one or more outriggers 13 and the operation of lifting and lowering the container through use of the crane arm 23. Because these two functions can occur at different times, the crane apparatus 3 as illustrated includes a single mechanical ram 4 that can be used to both 1) position one or more outriggers 13 and 2) raise and lower the crane arm 23. As such, both the outrigger 13 and the crane arm 23 can rotate about a common pivot 6. As used throughout this application, the mechanical ram can be a hydraulic cylinder or some other linear actuator. In these and other embodiments, the mechanical ram is activated electronically, hydraulically, and/or mechanically (which can include manually).

FIG. 1B is a back view of the trailer 1 with the container 2 offset and with the container trailer crane apparatus 3 thereon. The crane apparatus includes a crane arm 23 having a lifting end as shown connected to the container 2 and a pivot end as shown connected to the pivot 6. In some embodiments the crane arm 23 includes a crane arm extender 25. The outrigger 13 can have an outrigger extending portion 13a that extends out from the outrigger 13. The outrigger extending portion 13a can slide and lock in place. In some embodiments it is enabled to extend and retract through a mechanically assisted (e.g. geared) apparatus. It can also have one or more extending portions 13a that can telescope in and out. As shown, the extending portion 13a has a leg portion 14 connected thereto, and as shown, extending therefrom. In some instances, the leg portion 14 is hinged with a hinge 13b to the outrigger 13, or when having an extending portion 13a the leg portion 14 is hinged with a hinge 13b to extending portion 13a. The hinge 13b can have one or more locking positions at different angles along the path of hinge rotation movement. The leg portion 14 can have a leg extender 14a as shown in FIG. 1B. In some embodiments a foot 15 can extend from the leg portion, or when having a leg extender 14a the foot 15 can extend from leg extender 14a. The leg portion 14 can rotationally extend out from the outrigger 13 by force of gravity, by electromechanical force, or by hand.

As shown in the transition between FIG. 1B and FIG. 2B, the container 2 resting on the ground 100 in FIG. 1B is lifted onto the truck in FIG. 2B. As embodied in the transition between FIG. 1B and FIG. 2B the crane arm 23 in FIG. 1B has a crane arm extender 25 that can be used to lengthen or shorten the reach of the crane arm 23. As shown in FIG. 1B the crane arm extender 25 extends such that the container 2 can rest on the ground 100. At this point the mechanical ram 4 is at a shortened length, having pulled the crane arm 23 downward and toward the side of the trailer 1, and the container 2 is positioned for loading. As illustrated the outrigger 13 is positioned to stabilize the crane apparatus 3 and trailer 1. The outrigger arm 13a is extended and the leg portion 14 including leg extender 14a and foot 15 resting on the ground 100. As shown, the ground 100 where the leg portion 14 is resting is at a similar elevation and material as that where the trailer tires are resting. However, that is not always the case as the elevation and material can be different. Ground 100 includes the different definitions found in the Merriam Webster dictionary. Further, in some instances the outrigger 14 and/or outrigger leg 14a can extend and rest on a wall or any structure or item that can provide support; these instances are also considered as ground 100. As shown in FIG. 4 the container 2 is being lifted off the ground 100 by extension of the mechanical ram 4 as the crane arm 23 rotates about the common pivot 6.

As shown in the intermediate position between FIG. 1B and FIG. 2B, FIG. 4 illustrates the crane arm 23 and extender 25 having rotated about the common pivot 6. In FIG. 2B the crane arm 23 is substantially vertical and the extender arm 25 is retracted such that the container 2 moves vertically downward such that it rests on the trailer 1 as shown in FIG. 2B. Generally, at this point, the crane arm 23 is locked into position when alignment pin 7 engages and enters into the locking hole 8. In this locked position, the outrigger 13 is lifted off the ground 100 and positioned above the trailer 1. The outrigger 13 can be lifted by retraction of the mechanical ram 4. Because the crane arm 23 is locked in position in FIG. 2B the retraction of the mechanical ram 4 does not functionally lower the crane arm 23 and instead lifts the outrigger 13. The outrigger extender arm 13a can be retracted before or after the mechanical ram 4 lifts the outrigger 13. Also, in some embodiments the extender arm 25 can begin retracting before the crane arm 23 is locked into place.

As shown in FIGS. 3A and 3B, the outrigger 13 is lifted and located over the trailer 1. As also shown, in FIGS. 3A and 3B, the entire crane apparatus 3 can rotate about a rotation mechanism 10 such that the crane apparatus 3 with the mechanical rams 4 and outrigger 13 can rotate approximately 180° such that the outrigger and mechanical ram are disposed on the other side of the trailer 1 as previously shown. This is illustrated in the dotted lines of the rotated outrigger 13' and mechanical ram 4'.

Figure 5:
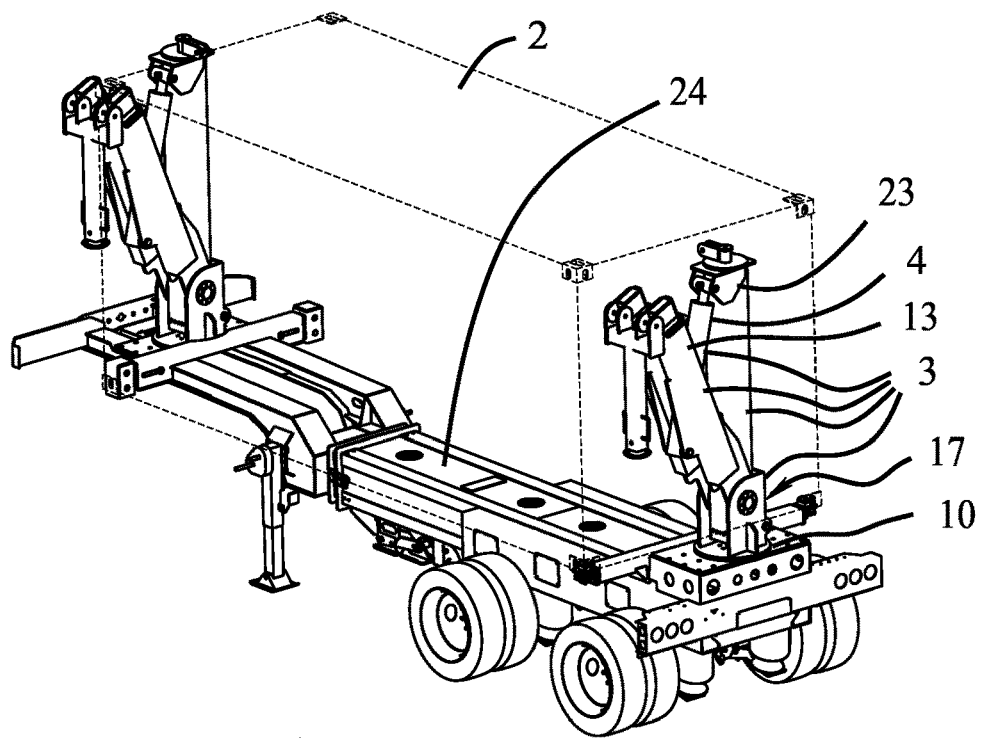
FIG. 5 is a perspective view of a container trailer crane apparatus on a trailer with a container and the crane apparatus positioned toward the left.
Figure 6:
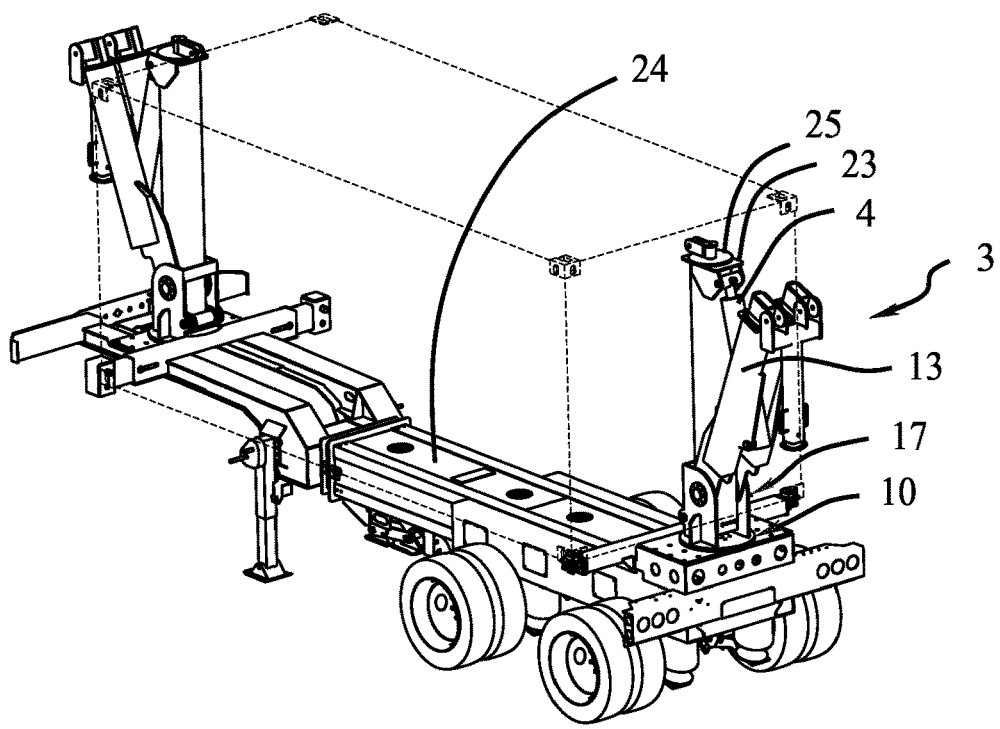
FIG. 6 is a perspective view of a container trailer crane apparatus on a trailer with a container and the crane apparatus positioned toward the back.
Figure 7:
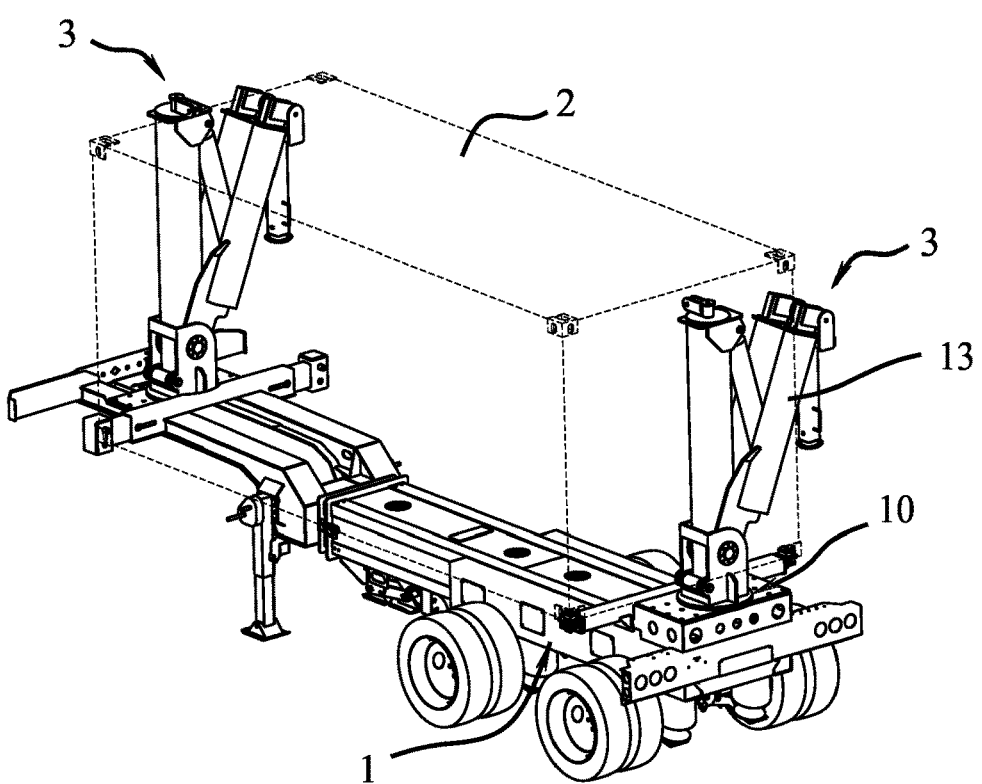
FIG. 7 is a perspective view of a container trailer crane apparatus on a trailer with a container and the crane apparatus positioned toward the right.

The progression from the crane apparatus 3 being located on one side of the trailer 1 and rotating to the other side is shown in FIGS. 5-7. In FIG. 5 the crane apparatus 3 is shown having a crane arm 23, an outrigger 13, a mechanical ram 4, and a crane base portion 17; as shown the crane apparatus portions including the outrigger 13 and mechanical ram is positioned toward the left side of the trailer (for more clarity, the left side of the trailer is considered as the long side of the trailer more adjacent to the container 2 in FIGS. 1A and 1B). In FIG. 6 the crane apparatus 3 is shown having a crane arm 23, an outrigger 13, a mechanical ram 4, and a crane base portion 17; as shown the crane apparatus is positioned further back of the trailer such that the outrigger 13 is leaning away from the container 2 and trailer 1. In FIG. 7 the crane apparatus 3 is shown having a crane arm 23, an outrigger 13, a mechanical ram 4, and a crane base portion 17; as shown in FIG. 7 the crane apparatus portions including the outrigger 13 and mechanical ram is positioned toward the right side of the trailer 1. The crane base portion 17 in some embodiments is part of the rotational mechanism 10; in other embodiments, the base portion 17 serves as attachment means and configured to attach to a trailer 1. In some embodiments, the base portion 17 is fixed when attached to a trailer 1. In other embodiments the base portion 17 rotates relative to the trailer 1.

The functioning of the crane apparatus 3 is similar on the right side to that functioning on the left side. It should be noted that generally two crane apparatuses 3 are used. particularly when moving a container 1 as shown in the figures, two crane apparatuses are used. However, in some embodiments, the inventive crane apparatus 3 can be paired with a different crane. In some embodiments, the other crane may not have an outrigger 3. In some embodiments, the other crane does not rotate from the left side to the right side (or vice versa).

In FIGS. 8-10 the crane apparatus 3 is shown with additional perspective. In FIG. 9 the apparatus 3 is shown in cross-section along line A-A. The crane apparatus 3 includes a mechanical ram 4 that when extended raises crane arm 23 and when retracted lowers crane arm 23 around the pivot 6. As arranged in FIGS. 9-10, when the crane arm is raised by the mechanical ram 4 till the crane arm hole 7 lines up with the locking hole 8 of the base 17 the crane arm 23 can be locked into place when a pin is inserted into the base locking hole 8 and the crane arm hole 7. In some embodiments, a loaded pin may be included within the crane arm hole 7 hole such that when lined up with the locking base hole 8 the loaded pin within the crane arm hole 7 may extend into the locking base hole 8 and lock the crane arm 23 in position. Often the crane arm 23 in the locked position is generally about perpendicular to the bed 24 of the trailer 1 (as shown in FIGS. 5-6). In some embodiments there may be additional crane arm hole(s) 7 and/or base locking hole(s) 8 such that the crane arm 23 locks in multiple positions.

When the crane arm 23 is in a locked position, retraction of the mechanical ram 4 pivots the outrigger 13 toward the crane arm 23. In many applications this results in the outrigger being lifted off the ground and/or moved into a secured position for transport, parking, or storage.

Figure 11A:
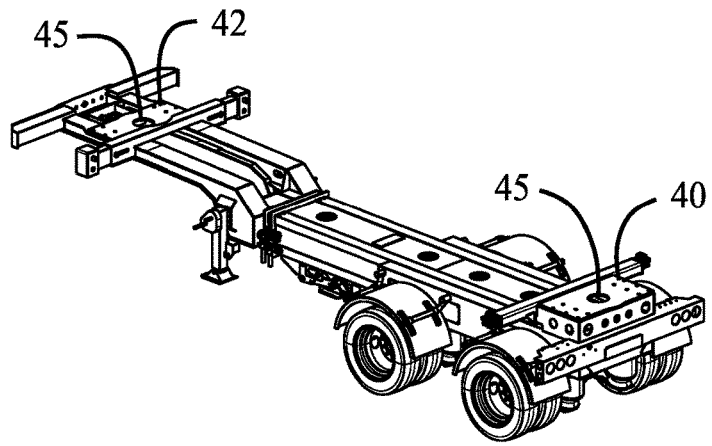
FIG. 11A is a perspective view of a trailer on which the crane apparatus can be mounted.
Figure 11B:
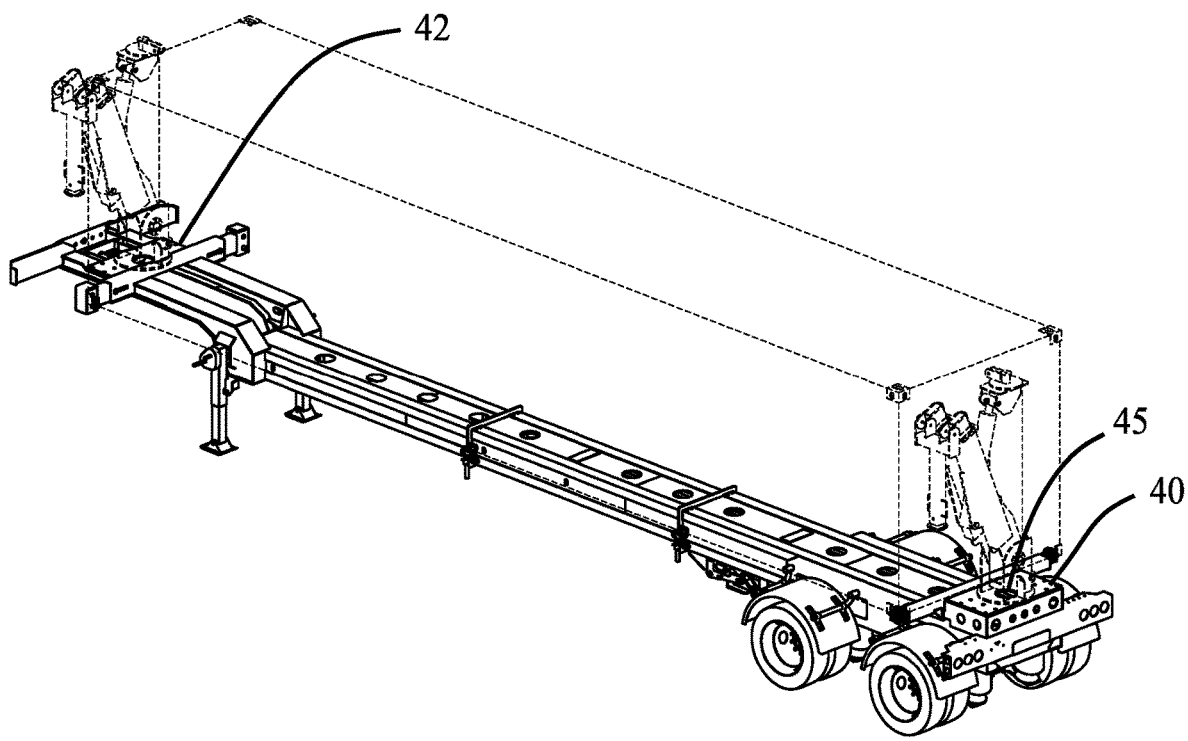
FIG. 11B is a perspective view of an extended trailer on which the crane apparatus can be mounted.

Among other attachment configurations, the base(s) 17 can attach to a trailer similar to the trailer 1 illustrated in FIGS. 11A-B at rear base seat 40 and/or at front base seat 42. As shown in FIG. 9, the base 17 can include a rotational mechanism including a base pivot 19. When attached to the trailer 1, the base pivot 19 engages a rotational coupling 45 in the base seat 42 of the trailer 1. The rotational coupling 45 can also be positioned at the rear base seat 40 location. Rotation of the base pivot 19 within the rotational coupling can allow the crane apparatus 3 to rotate from one side of the truck to the other such that it can load or deliver a container crate 2 to either side of the trailer 1. This rotation can be accomplished through various mechanical drives or manual methods.

As illustrated in FIGS. 11A-B, in some embodiments the crane apparatus 3 can be mounted on a trailer 1 which can also lengthen or shorten to better fit the length of a container 2.

The above disclosure is intended to be illustrative and not exhaustive. This description can suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented can be combined with each other in other manners within the scope of the invention such that the invention should be recognized as also specifically directed to other embodiments having any other possible combination of the features listed above.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A container trailer having a lifting apparatus, the lifting apparatus comprising a base, a crane arm, an outrigger, and a mechanical ram wherein the mechanical ram is used to position both the outrigger and the crane arm, the crane arm having a lifting end and a pivot end, the pivot end pivotally attached to the base such that the lifting end of the crane arm can be raised and lowered under force of the mechanical ram, the container trailer further including a locking hole and an engagement pin, the crane arm having a locked position and an unlocked position, wherein in the locked position the engagement pin is engaged in the locking hole and wherein in the unlocked position the engagement pin is not engaged in the locking hole, and in the locked position extension of the mechanical ram lowers the outrigger and retraction of the mechanical ram raises the outrigger, and in the unlocked position retraction of the mechanical ram draws the crane arm toward the outrigger and extension of the mechanical ram rotates the crane arm from the outrigger.

2. The container trailer of claim 1, wherein the outrigger has a leg, the outrigger having a raised position and a work position, wherein in the raised position the outrigger is lifted, and in the work position the outrigger is lowered and the leg engages the ground.

3. The container trailer of claim 1, wherein the crane arm can be lengthened and shortened through an extendable and retractable extender.

4. The container trailer of claim 3 wherein the extender is extended and retracted by electrical action.

5. The container trailer of claim 1, wherein the mechanical ram is selected from a broad group of hydraulic cylinders, linear actuators, turnbuckles, and any combination thereof.

6. The container trailer of claim 1, wherein the base of the lifting apparatus can rotate to enable the crane arm to lift items to the left of the trailer, to the right of the trailer, behind the trailer, to the left and behind the trailer, and to the right and behind the trailer.

7. The container trailer of claim 1, wherein the outrigger has an outrigger extender that is extendable and retractable.

8. The container trailer of claim 1, having a front and a back wherein the trailer has more than one lifting apparatus with at least one lifting apparatus in the back and at least one lifting apparatus in the front, the at least one lifting apparatus in the back constructed and arranged to be secured to the back of a container and the at least one lifting apparatus in the front constructed and arranged to be secured to the front of a container in order to lift and load the container onto the trailer.

9. The container trailer of claim 1, including a plurality of locking holes, the crane arm having a locked position and an unlocked position, in the locked position the engagement pin is engaged in one of the plurality of locking holes and in the unlocked position the engagement pin is not engaged in one of the plurality of locking holes.

10. A container trailer having a front and a back, and having a front lifting apparatus and a back lifting apparatus, each of the lifting apparatuses comprising a base, a crane arm, an outrigger, and a mechanical ram wherein the mechanical ram is used to position both the outrigger and the crane arm, each crane arm having a lifting end and a pivot end, the pivot end pivotally attached to the base such that the lifting end of each crane arm can be raised and lowered under force of the mechanical ram wherein each lifting apparatus includes at least one locking hole and at least one engagement pin, each crane arm having a locked position and an unlocked position, wherein in the locked position the at least one engagement pin is engaged in the at least one locking hole and wherein in the unlocked position the at least one engagement pin is not engaged in the at least one locking hole, and in the locked position extension of the mechanical ram lowers the outrigger and retraction of the mechanical ram raises the outrigger, and in the unlocked position retraction of the mechanical ram draws the crane arm toward the outrigger and extension of the mechanical ram rotates the crane arm from the outrigger.

11. The container trailer of claim 10, wherein the outrigger of each lifting apparatus has a leg, the outrigger having a raised position and a work position, wherein in the raised position the outrigger is lifted, and in the work position the outrigger is lowered and the leg is engaging the ground.

12. The container trailer of claim 10, wherein each mechanical ram is selected from a broad group of hydraulic cylinders, linear actuators, turnbuckles, and any combination thereof.

13. The container trailer of claim 10, wherein the base of the back lifting apparatus can rotate to enable the crane arm to lift items to the left of the trailer, to the right of the trailer, behind the trailer, to the left and behind the trailer, and to the right and behind the trailer.

14. The container trailer of claim 10, wherein the outrigger of each lifting apparatus has an outrigger extender that is extendable and retractable.

15. The container trailer of claim 10, wherein each crane arm can be lengthened and shortened through an extendable and retractable extender.

16. The container trailer of claim 15, wherein the extension of each crane arm is lengthened and shortened by hydraulic action.

* * * * *